United States Patent

Ose

[11] Patent Number: 5,618,241
[45] Date of Patent: Apr. 8, 1997

[54] BICYCLE SHIFTING DEVICE

[75] Inventor: Kenji Ose, Sakai, Japan

[73] Assignee: Shimano, Inc., Osaka, Japan

[21] Appl. No.: 580,066

[22] Filed: Dec. 20, 1995

[30] Foreign Application Priority Data

Dec. 20, 1994 [JP] Japan .................................. 6-316232
Dec. 20, 1994 [JP] Japan .................................. 6-316233

[51] Int. Cl.⁶ .................................................. F16H 59/00
[52] U.S. Cl. .............................. 474/80; 474/127; 74/489; 74/502.2
[58] Field of Search .......................... 474/78, 80, 82, 474/127; 74/489, 502.2

[56] References Cited

U.S. PATENT DOCUMENTS

| | | | |
|---|---|---|---|
| 3,886,806 | 6/1975 | Nagano | 74/491 |
| 4,198,873 | 4/1980 | Nagano et al. | 474/82 |
| 4,301,694 | 11/1981 | Costa | 74/502.2 X |
| 4,306,871 | 12/1981 | Nagano | 474/82 |
| 5,020,387 | 6/1991 | Nagano | 74/475 |
| 5,052,241 | 10/1991 | Nagano | 74/502.2 |
| 5,094,120 | 3/1992 | Tagawa | 74/502.2 X |
| 5,134,897 | 8/1992 | Romano | 74/489 |

FOREIGN PATENT DOCUMENTS

3-176290 7/1991 Japan .............................. B62M 25/04

Primary Examiner—Roger J. Schoeppel
Attorney, Agent, or Firm—James A. Deland

[57] ABSTRACT

A shift control device includes a movable member having a cable support for supporting the transmission cable, wherein the movable member moves as the shifting device actuates the transmission. An assist spring is provided for biasing the movable member in a direction opposite a direction of biasing of the movable member by the return spring of the transmission. The cable support supports the transmission cable such that tension exerted by the assist spring on the transmission cable remains substantially constant regardless of a position of the movable member as the shifting device actuates the transmission. In a more specific embodiment, the cable support moves the transmission cable in a straight line, and the cable support may move the transmission cable without winding the transmission cable about the cable support.

20 Claims, 9 Drawing Sheets

| Dimensions of parts | $a = 30 \pm 2, b = 29.2 \pm 0.3,$ $c = 2, d = 1.2$ |
|---|---|
| Winding direction | Right |
| Total number of coils | 11 coils, $180° \pm 4°$ |

BICYCLE SHIFTING DEVICE

BACKGROUND OF THE INVENTION

The present invention is directed to bicycle shift control devices and, more particularly, to bicycle shift control devices which employ a return spring in the transmission (such as a derailleur) and an assist spring in the shift control lever.

A conventional shifting control device is provided with an assist spring for movably energizing the shifting control piece in the direction opposite to the direction in which the piece is energized by a return spring in the transmission (such as a derailleur). The assist spring assists the shifting operation by partially compensating for the cable tension created by the return spring.

In such a shifting device, the operating force needed for down-shifting is the force obtained by adding the chain guide reaction force of the shifting control device and the frictional force of the control cable to the force obtained by subtracting the cable tension generated by the assist spring from the cable tension generated by the return spring. The operating force needed for up-shifting is obtained by adding the frictional force of the control cable to the cable tension generated by the assist spring. Down-shifting is accompanied by an increase in the spring force of the return spring and a reduction in the spring force of the assist spring, whereas up-shifting is accompanied by a reduction in the spring force of the return spring and an increase in the spring force of the assist spring.

Figure 13:
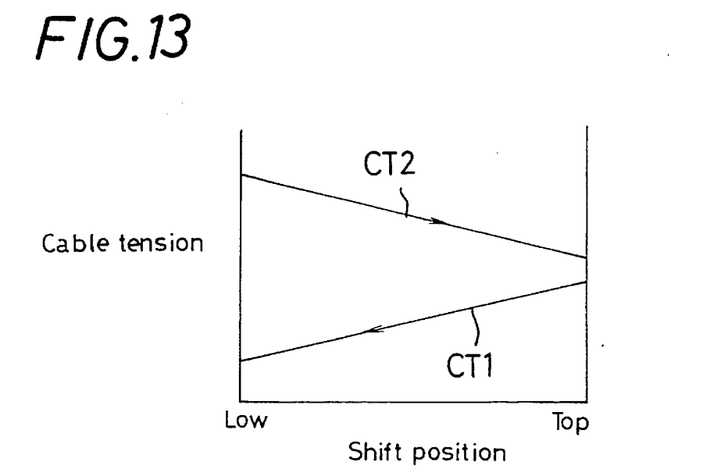
FIG. 13 is a graph illustrating cable tension in a prior art shifting mechanism.
Figure 14:
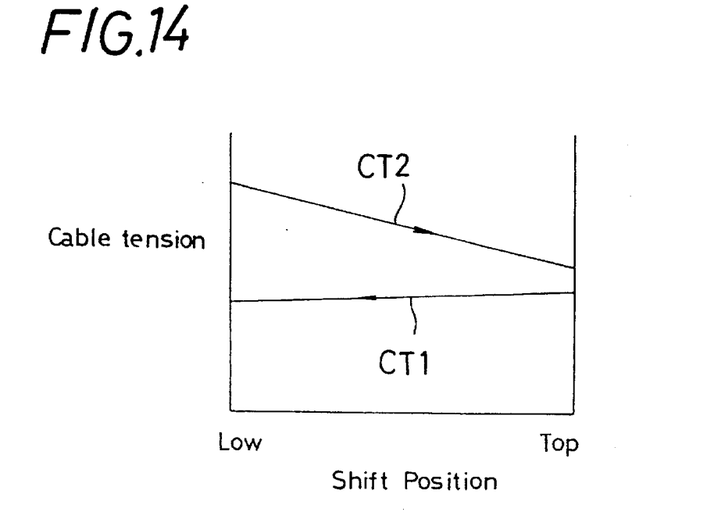
FIG. 14 is a graph illustrating cable tension in another prior art shifting mechanism.

FIGS. 13 and 14 show the relation between the tension CT1 exerted by the assist spring on the control cable and the tension CT2 exerted by the return spring on the control cable in some devices when, for example, the return spring of such a conventional shifting device energizes the derailleur in the direction of the top speed. As shown in FIG. 13, the difference between the operating force required for shifting on the low side and the operating force required for shifting on the top side can be quite substantial. A known shifting device force required for shifting on the top side can be quite substantial. A known shifting device having the tension relation shown in FIG. 14 has a smaller difference than does the shifting device having the tension relation shown in FIG. 13. While this is some improvement, a difference still exists between the operating force required for shifting on the low side and the operating force required for shifting on the top side. Furthermore, it should be noted that the tension difference varies depending upon the position of the shifting device and the transmission. More specifically, the difference decreases until the tension curves intersect, and then it increases again. This difference can be distracting to cyclists engaged in high performance riding, since there is a risk that the cyclist will underestimate or overestimate the shifting force required to go from one gear to another. This can result in missed shifts or incorrect shifts.

It should also be noted that in each case the cable tension CT2 generated by the return spring and the cable tension CT1 generated by the assist spring differ for some or all of the positions lying between the low position and the top position. Thus, if the initial positional relationship between the shift control device and the transmission changes due to stretching of the transmission cable or for some other reason, then tension characteristics will change as well. This could cause the entire system to no longer conform to design specifications. Also, it could further confuse cyclists who engage in high performance riding, since then the tension characteristics of the shifting device depend on how the transmission was set or adjusted by the bicycle mechanic, the amount of wear in the transmission, etc.

Figure 15:
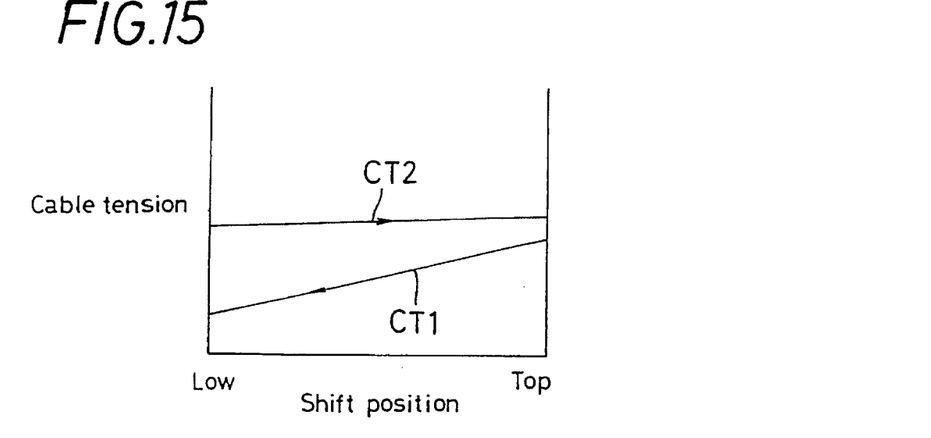
FIG. 15 is a graph illustrating cable tension in another prior art shifting mechanism.

Sometimes the derailleur is configured in such a way that the tension exerted by the return spring on the control cable is constant or virtually constant irrespective of the movement of the guide pulley. As shown in FIG. 15, the combined operation of the derailleur and shift control device still brings about a comparatively large increase in the difference between the cable tension CT1 exerted by the assist spring and the cable tension CT2 exerted by the return spring on the low-speed side. While such devices reduce the difference between the operating force exerted during shifting to a lower speed on the low-speed side and the operating force exerted during shifting to a lower speed on the high-speed side in comparison with FIG. 13, again a difference still exists.

SUMMARY OF THE INVENTION

The present invention is directed to a shift control device constructed with an assist spring such that the cable tension exerted on the transmission cable is substantially constant throughout substantially the entire operating range of the shift control device. This reduces the difference between the operating force required for shifting on the low side of the transmission and the operating force required for shifting on the top side of the transmission.

The present invention is also directed to a shift control device and transmission device wherein the tension on a transmission cable caused by an assist spring in the shift control device is balanced with the tension on the transmission cable caused by a return spring in the transmission. In other words, the difference in tension between the assist spring and the return spring remain substantially constant throughout substantially the entire operating range of the transmission. Thus, the cyclist can more readily estimate the amount of shifting force required to shift from one gear to another.

Furthermore, if both the shift control device and the transmission are constructed so that the cable tension exerted on the transmission cable by both the assist spring and the return spring is substantially constant throughout substantially the entire operating range of the shift control device and transmission, then the same operating force is required to shift from one gear to any other gear. This makes it very easy for the cyclist to estimate the force required to switch from one gear to another. Furthermore, even if the initial positional relationship between the shift control device and the transmission changes due to stretching of the transmission cable or for some other reason, the overall tension characteristics will not change.

In one embodiment of the present invention, a shift control device comprises a movable member having a cable support for supporting the transmission cable, wherein the movable member moves as the shifting device actuates the transmission. An assist spring is provided for biasing the movable member in a direction opposite a direction of biasing of the movable member by the return spring of the transmission. The cable support supports the transmission cable such that tension exerted by the assist spring on the transmission cable remains substantially constant regardless of a position of the movable member as the shifting device actuates the transmission. In a more specific embodiment, the cable support moves the transmission cable in a straight line, and the cable support may move the transmission cable without winding the transmission cable about the cable support. In a very specific embodiment, the transmission cable includes an outer cable surrounding an inner cable, and the shift control device includes an outer holder for supporting the outer cable at the shift control device, wherein the cable support supports the inner cable so that the inner cable extends in a straight line from the outer holder to a location where the inner cable is connected to the cable support. A transmission, such as a derailleur, may be constructed in a similar manner. When such a transmission and shift control device are operated together, then the tension exerted on the cable by each device is substantially constant throughout substantially the entire operating range of the system.

DETAILED DESCRIPTION OF THE EMBODIMENTS

Figure 1:
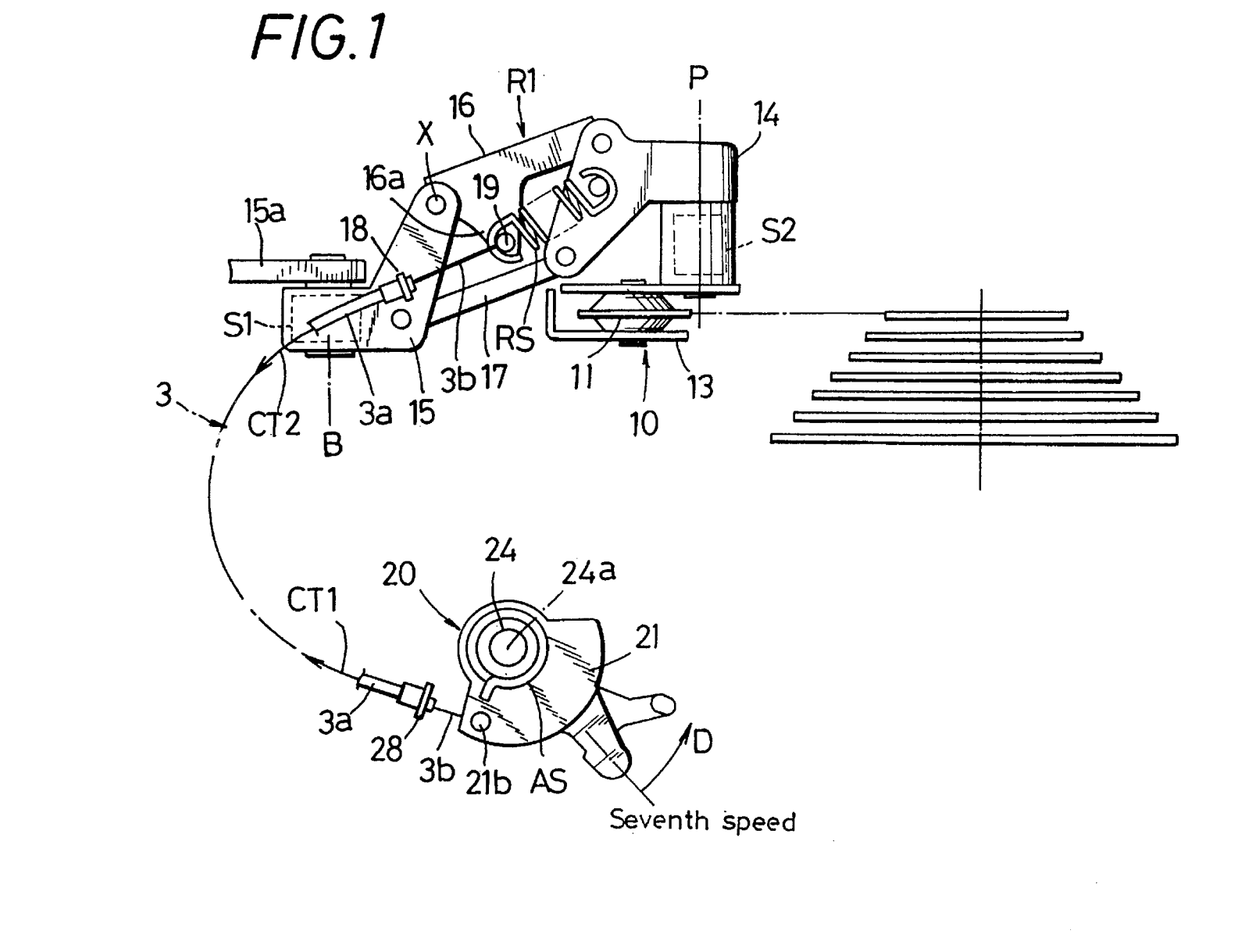
FIG. 1 is a diagram of a particular embodiment of the present invention wherein a rear derailleur is disposed at a small freewheel gear.
Figure 4:
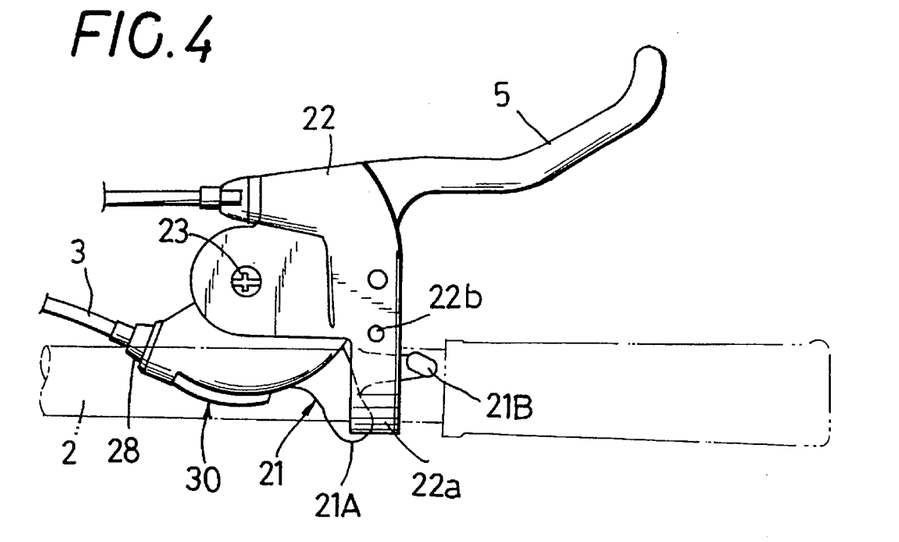
FIG. 4 is a top view of a particular embodiment of a shift control device according to the present invention.

As shown in FIGS. 1 and 4, a bicycle shifting control device 20 is formed by attaching a single shifting lever 21 to a lever bracket 22 shaped in such a way that a brake lever 5 can be attached close to the grip of a handlebar 2. The bicycle shifting control device 20 is connected by a control cable 3 consisting of an outer cable 3a and an inner cable 3b to a bicycle rear derailleur 10 equipped with a guide pulley 11, a return spring RS, and the like, as shown in FIG. 1, and a chain 4 is moved between the seven rear gears for driving the rear wheel of a bicycle by operating the rear derailleur 10 with the aid of the shifting lever 21 through the intermediary of the control cable 3. The structure will now be described in detail.

Figure 5:
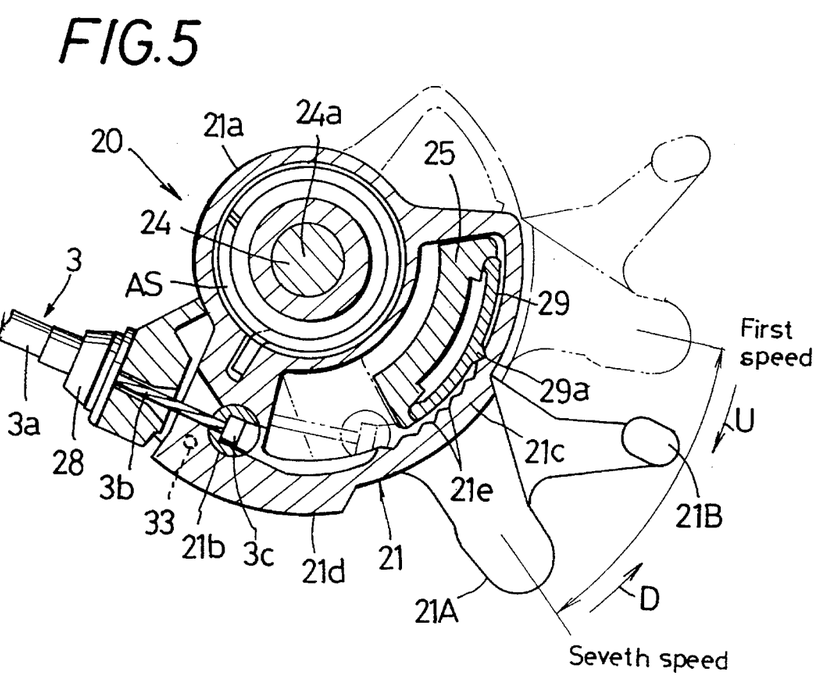
FIG. 5 is a top cross-sectional view of the shift control device shown in FIG. 4.
Figure 6:
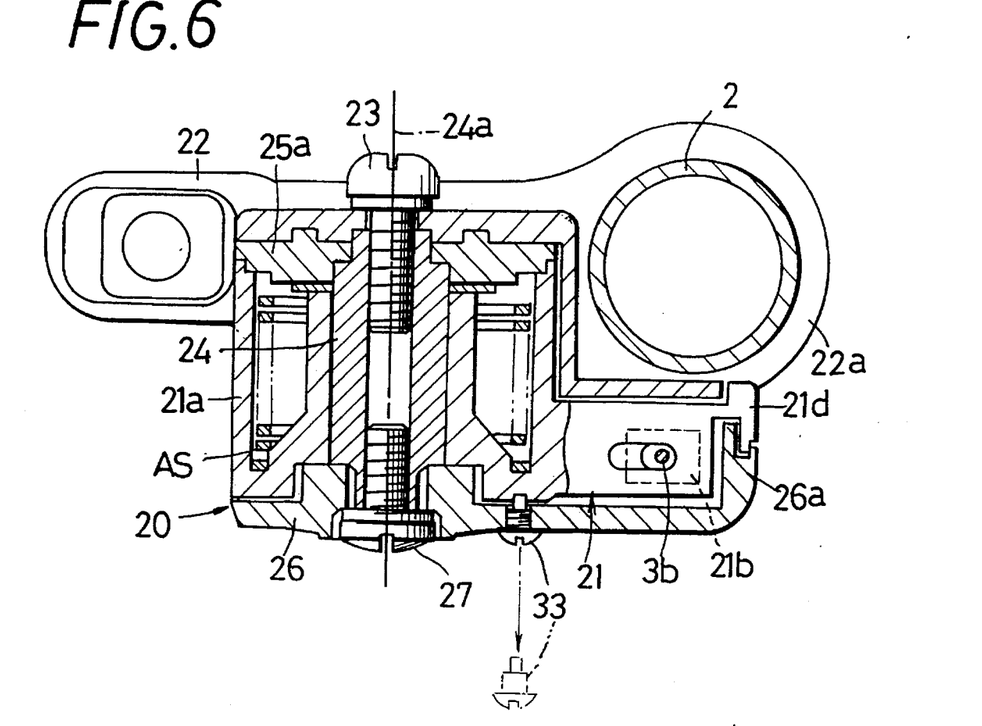
FIG. 6 is a side cross-sectional view of the shift control device shown in FIG. 4.

Specifically, as shown in FIGS. 4, 5, and 6, the aforementioned lever bracket 22 is attached to the handlebar 2 by setting a band portion 22a, provided on the side opposite to the side on which the brake lever 5 is positioned, on the handlebar 2 and fastening said bracket with the aid of an attachment screw 22b. Attached to this lever bracket 22 are a spindle member 24 configured in such a way that it can be fastened and fixed with an attachment screw 23, and a pawl holder 25 configured in such a way that it can be fastened and fixed to the lever bracket 22 with the aid of the spindle member 24. The aforementioned shifting lever 21 is supported on the aforementioned spindle member 24 while being allowed to rotate about the axis 24a of the spindle member 24, and a cover 26 that houses the base portion 21a of the shifting lever 21 and the like is fixed to the end portion of the spindle member 24 with the aid of an attachment screw 27, forming a structure in which the end portion provides a spline engagement without the possibility of rotation. The base portion 21a of the shifting lever 21 houses an assist spring (torsional coil spring) AS. The aforementioned cover 26 is equipped with an outer holder 28 for supporting the outer cable 3a of the control cable 3, and with a cable support 21b configured in such a way that the inner cable 3b of the control cable 3 is connected to the aforementioned shifting lever 21 by catching and holding a cable nipple 3c. The aforementioned shifting control device 20 is thus configured.

That is, the shifting lever 21 is attached to the handlebar 2 with the aid of the spindle member 24 and the lever bracket 22 serving as attachment members, while being allowed to perform a reciprocating swinging motion about the axis 24a, and is operated by either of two finger control tabs 21A and 21B that are provided to the portions projecting beyond the cover 26 of the shifting lever 21 in such a way that these tabs are positioned below the handlebar 2 separately from each other in the direction of travel of the shifting lever 21. Specifically, when the shifting lever 21 is to be actuated in the swing direction D shown in FIG. 5, the thumb is brought into contact with the finger control tab 21A and control may be performed over the entire stroke using the finger control tab 21A alone, and when the shifting lever 21 is to be actuated in the swing direction U shown in FIG. 5, the forefinger is brought into contact with the finger control tab 21B and control may be performed over the entire stroke using the finger control tab 21B alone.

Seven positioning detents 21e provided to the positioning portion 21c of the shifting lever 21, and a positioning pawl 29 made of resin and attached to the aforementioned pawl holder 25 constitute a positioning mechanism for positioning the shifting lever 21 in seven predetermined operating positions. Because a positioning ball or the like can also be adopted instead of the positioning pawl 29, these will all be referred to collectively as "the positioning pawl 29." Specifically, when the shifting lever 21 is swung, the resulting operating force will cause the active portion 29a of the positioning pawl 29 to engage a positioning detent 21e or disengage from it, and when the active portion 29a of the positioning pawl 29 enters a positioning detent 21e, the engagement of the active portion 29a brings the shifting lever 21 in a predetermined operating position. That is, the shifting lever 21 moves between the position of the lowest (first speed, in which, of the seven positioning detents 21e, the positioning detent 21e closest to one edge registers with the active portion 29a of the positioning pawl 29, and the position of the highest (seventh) speed, in which, of the seven positioning detents 21e, the positioning detent 21e closest to the other edge registers with the active portion 29a of the positioning pawl 29.

The cable support 21b is formed in such a way that the inner cable 3b is pulled out from the outer cable 3a as the shifting lever 21 is down-shifted, the inner cable 3b is let out toward the derailleur as the shifting lever 21 is up-shifted, and the inner cable 3b that has been pulled out of the outer cable 3a remains stretched in a straight line without being wound. The assist spring AS rests against the lever bracket 22 as a result of the fact that one end of the spring is fixed in the seat 25a for attaching the pawl holder 25 to the lever bracket 22, and the other end rests against the base portion 21a of the shifting lever 21 and is used to energize the shifting lever 21 into the aforementioned first-speed position. Specifically, energizing is performed in a direction opposite to that in which the shifting lever 21 is energized by the return spring RS of the derailleur 10 through the intermediary of the control cable 3.

Figure 8:
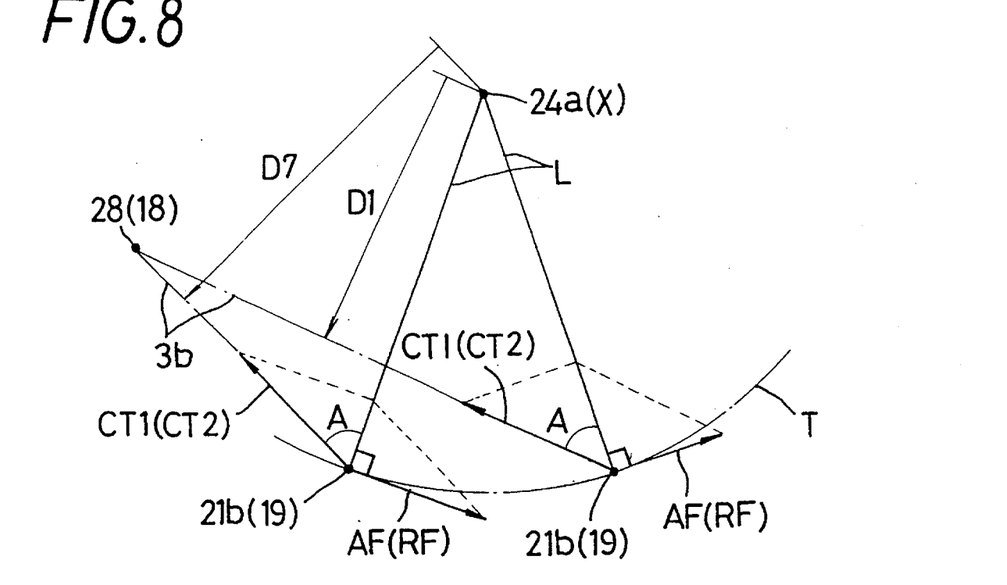
FIG. 8 is a geometrical diagram illustrating cable tension in a rear derailleur and shift control device according to the present invention.

As shown in FIG. 8, when the shifting lever 21 moves through the operating range between the first-speed position and the seventh-speed position, the cable support 21b that serves as the support point of the inner cable 3b moves along a circular-arc trajectory T whose center is the swing axis 24a of the shifting lever 21. Assuming that an assist force AF for swinging the shifting lever 21 is generated for the assist spring AS along this trajectory T, cable tension CT1 is exerted on the inner cable 3b between the cable support 21b and the outer holder 28 due to this assist force AF. The tension value ratio of the cable tension CT1 to the assist force AF varies with the inclination angle A formed by the inner cable 3b with a line L passing through the swing axis 24a and the cable support 21b. As a result, changing the aforementioned inclination angle A in a suitable manner prevents the cable tension CT1 from undergoing any changes or makes these changes smaller than those of the assist force AF even when the cable support 21b moves, and the assist force AF changes due to the torsional changes of the assist spring AS.

Figure 9:
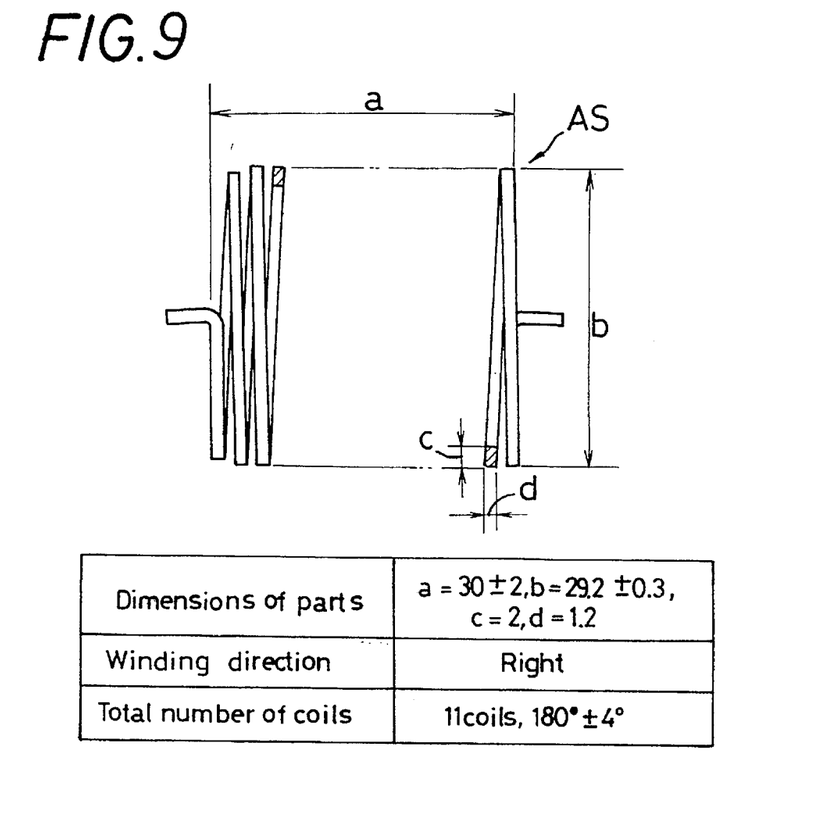
FIG. 9 is a diagram of a particular embodiment of an assist spring employed in a shift control device according to the present invention.
Figure 10:
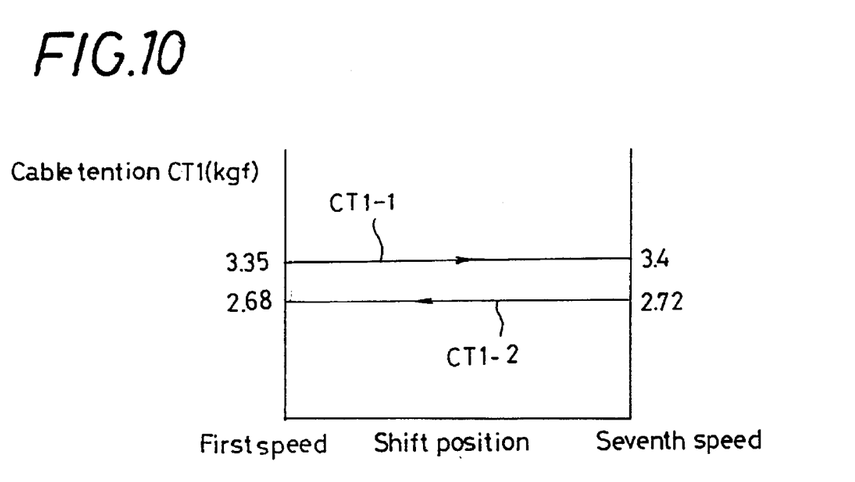
FIG. 10 is a graph illustrating cable tension in a particular embodiment of the present invention.

The aforementioned inclination angle A is determined by setting the positional relationship for the cable support 21b of the shifting lever 21 and the outer holder 28 of the cover 26. Selecting a suitable positional relationship for the cable support 21b and the outer holder 28 will therefore yield a virtually constant cable tension CT1, exerted on the inner cable 3b by the assist spring AS, when the shifting lever 21 is brought to any of the first-through seventh-speed positions or to any speed position between the first- and seventh-speed positions (between the first- and second-speed positions, between the fourth- and fifth-speed positions, etc.), that is, to any operating position within the entire operating range. Based on this, the torsional coil spring shown in FIG. 9 is adopted as the assist spring AS, the cable support 21b and the outer holder 28 are arranged in such a way that the positional relationship shown in FIG. 8 is obtained, and the virtually constant cable tensions CT1-1 and CT1-2 shown in FIG. 10 are generated.

Specifically, the cable support 21b and the outer holder 28 are arranged in such a way that moving the shifting lever 21 to the first-speed position brings the axis of the inner cable 3b extending between the outer holder 28 and the cable support 21b to a distance D1 of about 25.9 mm from the swing axis 24a of the shifting lever 21, and moving the shifting lever 21 to the seventh-speed position brings the axis of the inner cable 3b extending between the outer holder 28 and the cable support 21b to a distance D7 of about 29 mm from the aforementioned swing axis 24a. The cable tensions CT1-1 and CT1-2 shown in FIG. 10 were measured when the tension exerted on the inner cable 3b by the outer holder 28 was measured for a case in which the shifting lever 21 was operated while the positioning pawl 29 was removed and prevented from acting on the shifting lever 21. Specifically, the cable tension CT1-1 has a magnitude of 3.35 to 3.4 kgf at the cable tension generated when the shifting lever 21 is up-shifted from the first- to the seventh-speed position. Friction and the like create a certain difference between the cable tension CT1-1 generated when the shifting lever 21 is up-shifted and the cable tension CT1-2 generated during down-shifting. That is, the assist spring AS exerts a virtually constant cable tension CT1 of 2.68 to 3.4 kgf on the inner cable 3b when the shifting lever 21 is placed in any operating position within the entire operating range.

Figure 16:
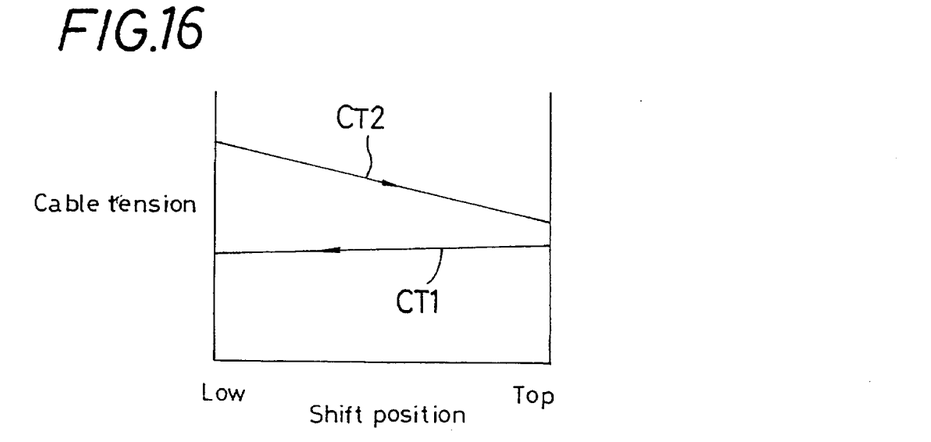
FIG. 16 is a graph illustrating cable tension in another embodiment of the present invention.

When a derailleur is shifted in the operating direction against the action of the return spring, extra operating force is provided by the assist spring, and shifting can be performed while the operating force to be applied by the rider is reduced by the amount of assistance provided by the assist spring. In the process, the cable support holds the control cable in such a way that the cable tension exerted by the assist spring remains constant or virtually constant in any operating position of the shifting control piece, so when a derailleur in which the return spring exerts a varying cable tension is actuated, the cable tension CT1 exerted by the assist spring and the cable tension CT2 exerted by the return spring are in the tension relation shown in FIG. 16, making it possible to perform shifting while the difference between the human assisted operating force required for the lower-speed side and the human-assisted force required for the higher-speed side is reduced in comparison with the conventional example shown in FIG. 13. In addition, when a derailleur in which the return spring exerts constant or virtually constant cable tension is operated, the cable tension CT1 exerted by the assist spring and the cable tension CH exerted by the return spring are in the tension relation shown in FIG. 10, making it possible to perform shifting while the difference between the human-assisted operating force required for the lower-speed side and the human-assisted force required for the higher-speed side is reduced in comparison with the conventional example shown in FIG. 13.

Figure 3:
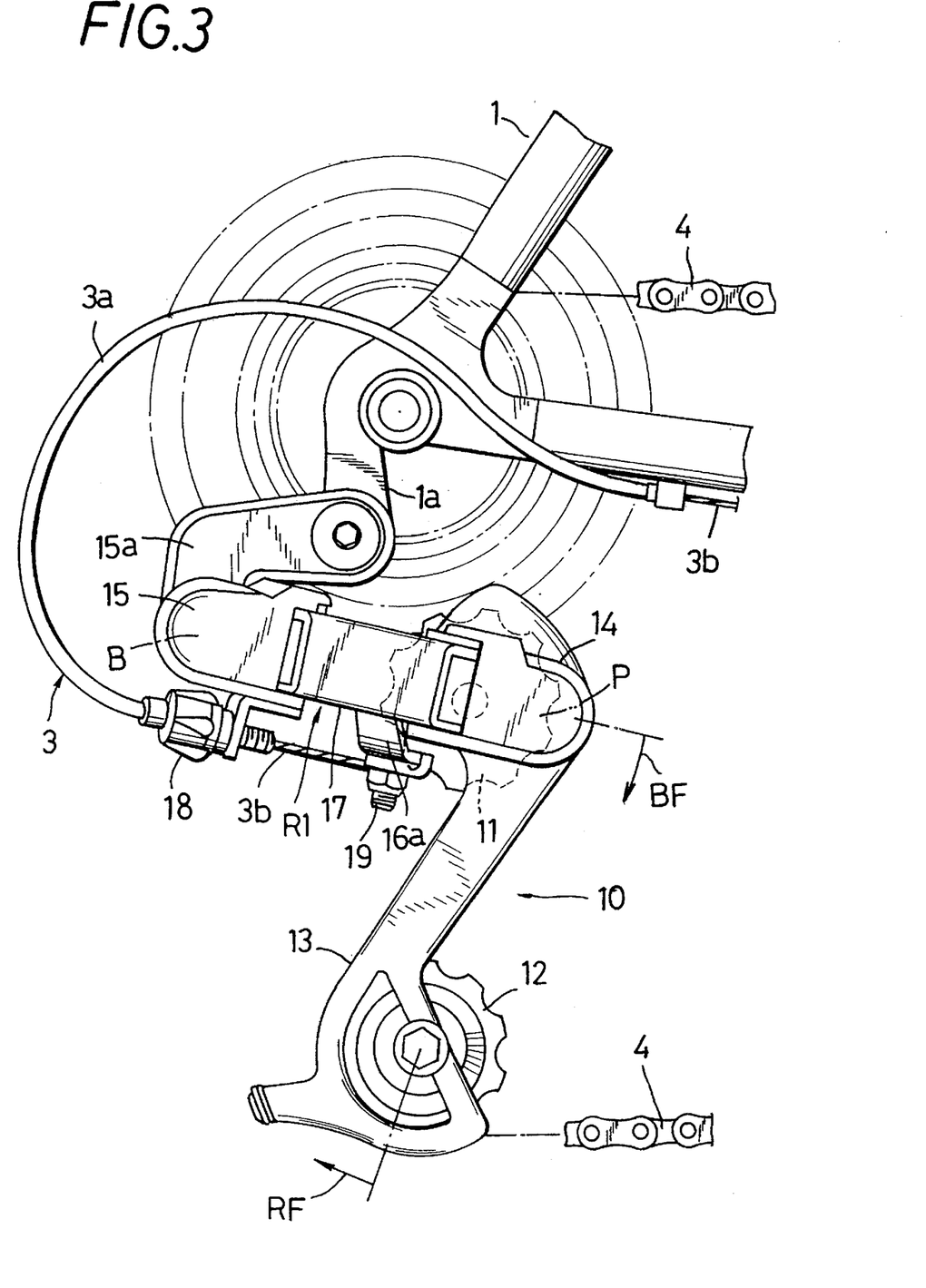
FIG. 3 is a side view of a particular embodiment of a rear derailleur according to the present invention.

The rear derailleur 10 is configured as shown in FIGS. 1 and 3. Specifically, the following two components are connected together with the aid of a pair of left and right swing links 16 and 17: a support 14 to which a guide pulley 11 and a tension pulley 12 are attached by means of a chain guide 13, and a bracket 15 configured to allow bolt connection to the rear wheel fork 1 by means of a connecting plate 15a. The support 14, the swing links 16 and 17, and the bracket 15 are configured in such a way that they form a parallel four-link mechanism R1. A return spring RS serving as a tension coil spring is attached between the support 14 and a control arm 16a projecting from the right swing link 16 toward the left swing link 17 (the two links form a pair of left and right swing links 16 and 17); a first tension spring S1 (torsional coil spring) is housed in that part of the connecting plate 15a of the bracket 15 which is connected while allowed to rotate about an axis B; and a second tension spring S2 (torsional coil spring) is housed in that part of the chain guide 13 of the support 14 which is connected while allowed to rotate about an axis P. The bracket 15 is provided with an outer holder 18 for supporting the outer cable 3a of the control cable 3, and the aforementioned control an 16a is provided with a cable support configured in such a way that the inner cable 3b of the control cable 3 can be fastened and connected with the aid of a cable fixing screw 19.

Figure 2:
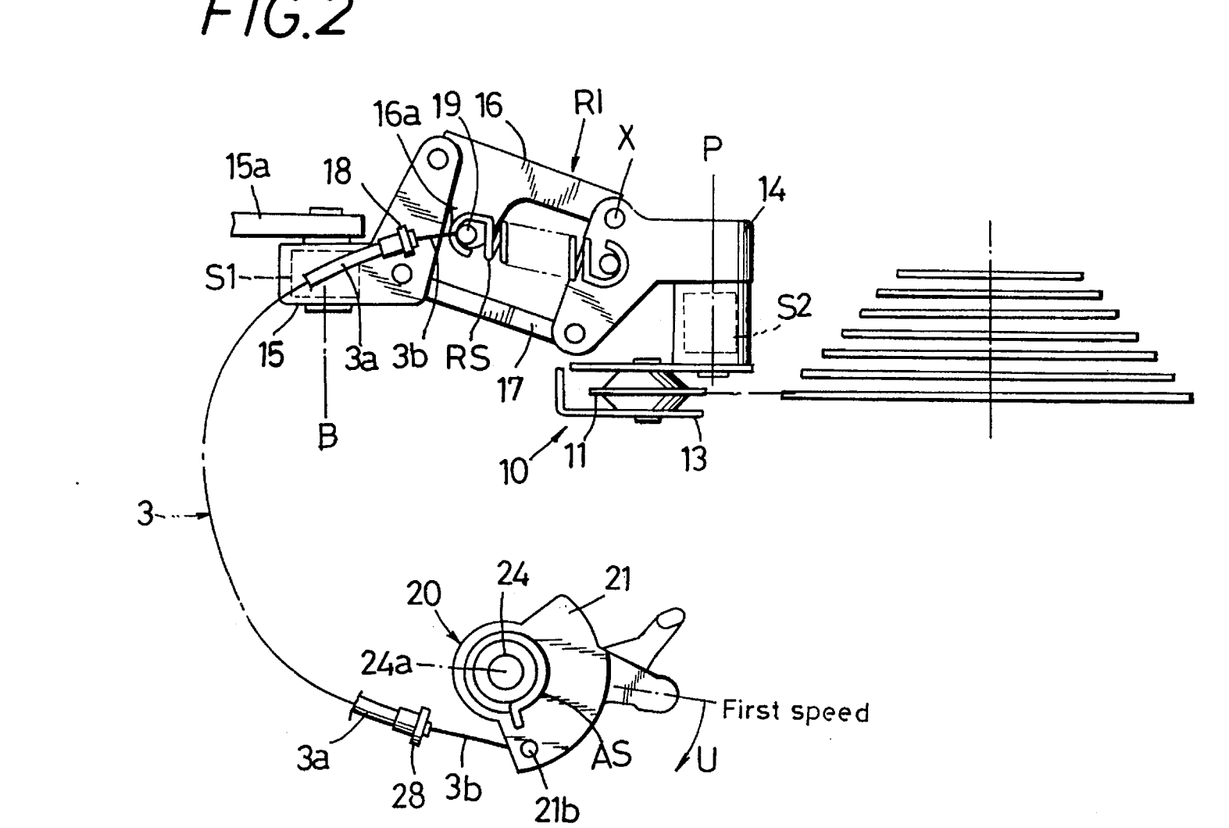
FIG. 2 is a diagram of a particular embodiment of the present invention wherein a rear derailleur is disposed at a large freewheel gear.

That is, the guide pulley 11 is attached by means of the parallel four-link mechanism R1 to a derailleur attachment 1a projecting from the fork end portion of the rear wheel fork 1, and is allowed to move in a reciprocating fashion across the frame. This allows the guide pulley 11 to move in a reciprocating fashion across the frame between the first-speed position (the lowest speed), where the chain 4 is engaged by the lowest of the seven gears, that is, by one having the largest diameter and lying on the side closest to the frame, as shown in FIG. 2, and the seventh-speed position (the highest speed), where the chain 4 is engaged by the top gear of the seven gears, that is, by one having the smallest diameter and lying on the side farthest from the frame, as shown in FIG. 1.

A tensile force exerted by the inner cable 3a moves the chain over the seven rear gears from the small-diameter side to the large-diameter side, changing chain engagement from higher speeds to lower speeds. An elastic recovery force exerted by the return spring RS moves the chain over the seven rear gears from the large-diameter side to the small-diameter side, changing chain engagement from lower speeds to higher speeds. One end of the first tension spring S1 rests against the connecting plate 15a, and the other end against the bracket 15. The first tension spring S1 energizes the bracket 15 in the swing direction BF about the axis B with respect to the rear wheel fork 1, and tension is thus exerted on the chain 4 through the intermediary of the guide pulley 11 and the tension pulley 12. One end of the second tension spring S2 rests against the support 14, and the other end against the chain guide 13. The second tension spring S2 energizes the chain guide 13 in the swing direction PF about the axis P with respect to the support 14, and tension is thus exerted on the chain 4 through the intermediary of the guide pulley 11 and the tension pulley 12.

As shown in FIG. 8, when the guide pulley 11 of the rear derailleur 10 moves from the first-speed position toward the seventh-speed position, the cable fixing screw 19 that serves as the connection point of the inner cable 3b moves along a circular-arc trajectory T whose center is a connecting pin axis X serving as the connection center between the right swing link 16 and the bracket 15. If it is assumed that a return force RF for swinging the right swing link 16 is generated for the return spring RS along this trajectory T, then cable tension CT2 will be exerted on the inner cable 3b between the connection point 19 and the outer holder 18 due to this return force RF. The tension value ratio of this cable tension CT2 to the return force RF varies with the inclination angle A formed by the inner cable 3b with a line L passing through the connecting pin axis X and the connection point 19. As a result, changing the aforementioned inclination angle A in a suitable manner prevents the cable tension CT2 from undergoing any changes or makes these changes smaller than those of the return force RF even when the connection point 19 moves, and the return force RF is changed due to changes in the length of the return spring RS.

The aforementioned inclination angle A is determined by setting the positional relationship for the cable connection point 19 of the right swing link 16 and the outer holder 18 of the bracket 15. Selecting a suitable positional relationship for the cable connection point 19 and the outer holder 18 will therefore yield a constant or virtually constant tension CF2, exerted on the inner cable 3b by the return spring RS, when the guide pulley 11 is brought to any of the first- through seventh-speed positions or to any speed position between the first- and seventh-speed positions (between the first- and second-speed positions, between the fourth- and fifth-speed positions, etc.), that is, to any position within the entire operating range, in a state in which the chain 4 is not wound around the guide pulley 11 or the tension pulley 12 and in which there is no guide reaction from chain 4 on the guide pulley 11. Arranging the outer holder 18 and the cable connection point 19 of the right swing link 16 on the basis of the above considerations allows the return spring RS to exert a cable tension CT2 of 2.68 to 3.4 kgf on the inner cable 3b irrespective of the position of the guide pulley 11 in a state in which the chain 4 engages neither the guide pulley 11 nor the tension pulley 12 and there is no guide reaction from chain 4 on the guide pulley 11.

That is, when the shifting lever 21 is operated while the positioning pawl 29 does not act on the shifting lever 21 in a state in which the rear derailleur 10 and the shifting control device 20 are merely connected together by the control cable 3 but remain unattached to the frame, or in a state in which the components are attached to the frame but the chain 4 engages neither the guide pulley 11 nor the tension pulley 12 and there is no guide reaction from the chain 4 on the guide pulley 11, balance exists between the cable tension CT2 exerted by the return spring RS on the inner cable 3b and the cable tension CT1 exerted by the assist spring AS on the inner cable 3b, even in cases in which the shifting lever 21 is brought to any of the first- through seventh-speed positions or to any speed position between the first- and seventh-speed positions (between the first- and second-speed positions, between the fourth- and fifth-speed positions, etc.), that is, to any position within the entire operating range.

In short, during down-shifting the shifting lever 21 is actuated in the swing direction D shown in FIGS. 1 and 5. In this case the shifting lever 21 pulls the inner cable 3b, and the inner cable 3b moves the guide pulley 11 together with the tension pulley 12 toward the frame while elastically deforming the return spring RS. As a result, the guide pulley 11 guides the chain 4 from the small-diameter side to the large-diameter side of the rear gears, and to switch the shifting stage from higher speeds to lower speeds. When the shifting stage is switched at this time to any speed between the first and seventh speeds, balance is preserved between the tension CT2 exerted by the return spring RS on the inner cable 3b and the tension CT1 exerted by the assist spring AS, and the assist spring AS provides the extra operating force necessary to elastically deform the return spring RS. As a result, the shifting lever 21 is actuated by means of a human-initiated operating force against the chain guide resistance acting on the guide pulley 11, against the friction between the inner cable 3b and the outer cable 3a of the control cable 3, and against the operating resistance of the positioning pawl 29.

Figure 7:
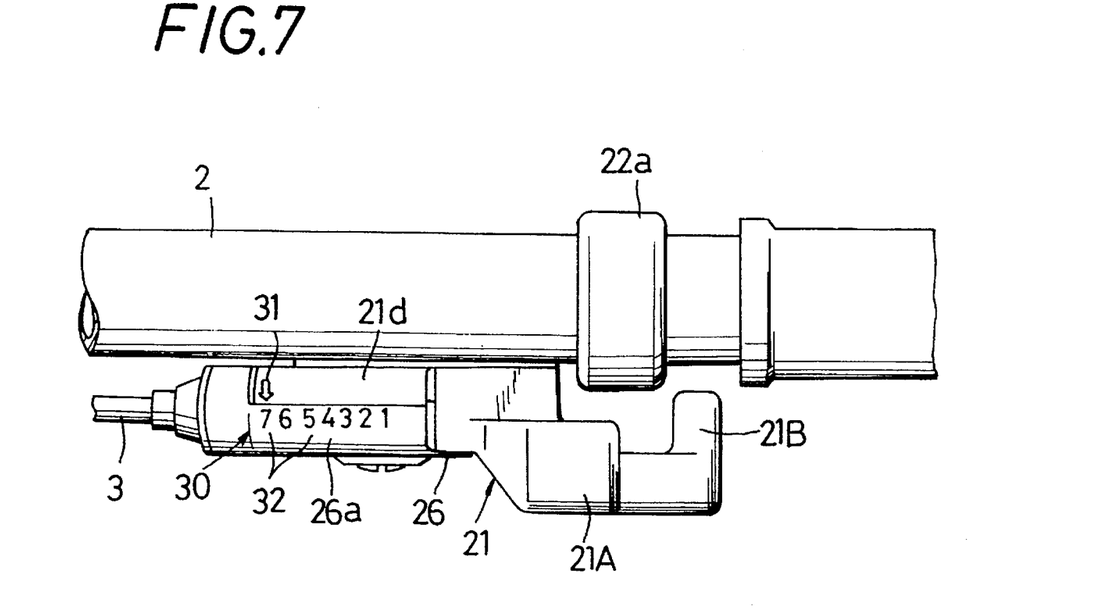
FIG. 7 is a rear view of the shift control device shown in FIG. 4.

During up-shifting the shifting lever 21 is actuated in the swing direction U shown in FIGS. 2 and 5. In this case the shifting lever 21 lets out the inner cable 3b, and the letting-out of the cable allows the return spring RS to undergo elastic recovery and to move the guide pulley 11 together with the tension pulley 12 away from the frame against the chain guide resistance acting on the two pulleys 11 and 12. As a result, the guide pulley 11 changes the engagement of the chain 4 from the large-diameter side of the rear gears to the small-diameter side, and the shifting stage switches from lower speeds to higher speeds. When the shifting stage is switched at this time to any speed between the first and seventh speeds, balance is preserved between the tension CT2 exerted by the return spring RS on the inner cable 3b and the tension CT1 exerted by the assist spring AS, and the return spring RS provides the extra operating force necessary to elastically deform the assist spring AS. As a result, the shifting lever 21 is actuated by means of a human-initiated operating force against the friction between the inner cable 3b and the outer cable 3a of the control cable 3, and against the operating resistance of the positioning pawl 29. As shown in FIG. 7, an arrow-type pointer 31, projecting beyond the cover 26 of the shifting lever 21, is installed on the peripheral portion 21d extending backward with respect to the frame; seven numerical shift markings 32 are formed on the wall section 26a that corresponds to the aforementioned peripheral portion 21d of the cover 26 and that extends backward with respect to the frame; and the aforementioned peripheral portion 21d and wall section 26a constitute an indicator 30 for shift indication.

Specifically, when the shifting lever 21 is swung, the peripheral portion 21d moves in relation to the wall section 26a, and when the shifting lever 21 is brought to the desired operating position between the first- and seventh-speed positions, the pointer 31 displays, out of the seven numerical shift markings 32, the marking that corresponds to the operating position of the shifting lever 21, letting the rider know which of the shift markings 32 is indicated by the pointer 31, and thus making it possible to determine which of the first to seven speeds has been selected as the shifting stage. The structure of the indicator can be simplified by employing the shifting lever 21 as the pointing member, and the cover 26 as the display panel member.

The setscrew 33 shown in FIGS. 5 and 6 is attached to the cover 26 in such a way that the tip of the setscrew 33 fits into an indent of the shifting lever 21 and exerts an arresting action on the shifting lever 21. When the setscrew 33 exerts an arresting action on the shifting lever 21, the shifting lever 21 is fixed in the seventh-speed position. That is, when the rear derailleur 10 and the shifting control device 20 are assembled on the frame and connected with a control cable 3, the derailleur 10 is energized into the seventh-speed position by the return spring RS, facilitating connection operations in cases in which the shifting lever 21 is held in the seventh-speed position against the action of the assist spring AS when the latter is in a deformed state in which the spring force is at a maximum. It is therefore possible to place the setscrew 33 in an active position in advance during the connection of the control cable 3, and to facilitate the connection while dispensing with the manual operation for keeping the shifting lever 21 in the seventh-speed position against the action of the assist spring AS. Upon completion of the connecting operations, the setscrew 33 is detached, or the tip is removed from the shifting lever 21 and switched to an attachment position in which the arresting action is canceled, making it possible to use the shifting lever 21. Thus, using the setscrew 33 to keep the shifting lever 21 in the seventh-speed position makes it possible to set a lower coupling force for positioning the shifting lever 21 of the positioning mechanism in the desired operating position than when the shifting lever 21 is kept in the seventh-speed position by the positioning mechanism. Specifically, when there is a difference in tension between the assist spring AS and the return spring RS, the positioning mechanism will operate in a prescribed manner if the coupling force is set at a level at which the shifting lever 21 can be kept in the operating position against the action of this tension difference. When balance is preserved between the tension of the assist spring AS and the tension of the return spring RS, the positioning mechanism will operate in a prescribed manner if the positioning and coupling force is set at a level lower than that at which the shifting lever 21 can be prevented from being actuated by vibration or the like, and at which it is possible to ascertain that the shifting lever 21 is in a prescribed operating position. As a result, the shifting control resistance of the positioning mechanism can be minimized and shifting control facilitated.

The same effect can be obtained by replacing the setscrew 33 with a pin, key, or a pad or other object packed at a prescribed location between the shifting lever and the cover or the like. Various stoppers switchable between active and idle states can be adopted.

Figure 11:
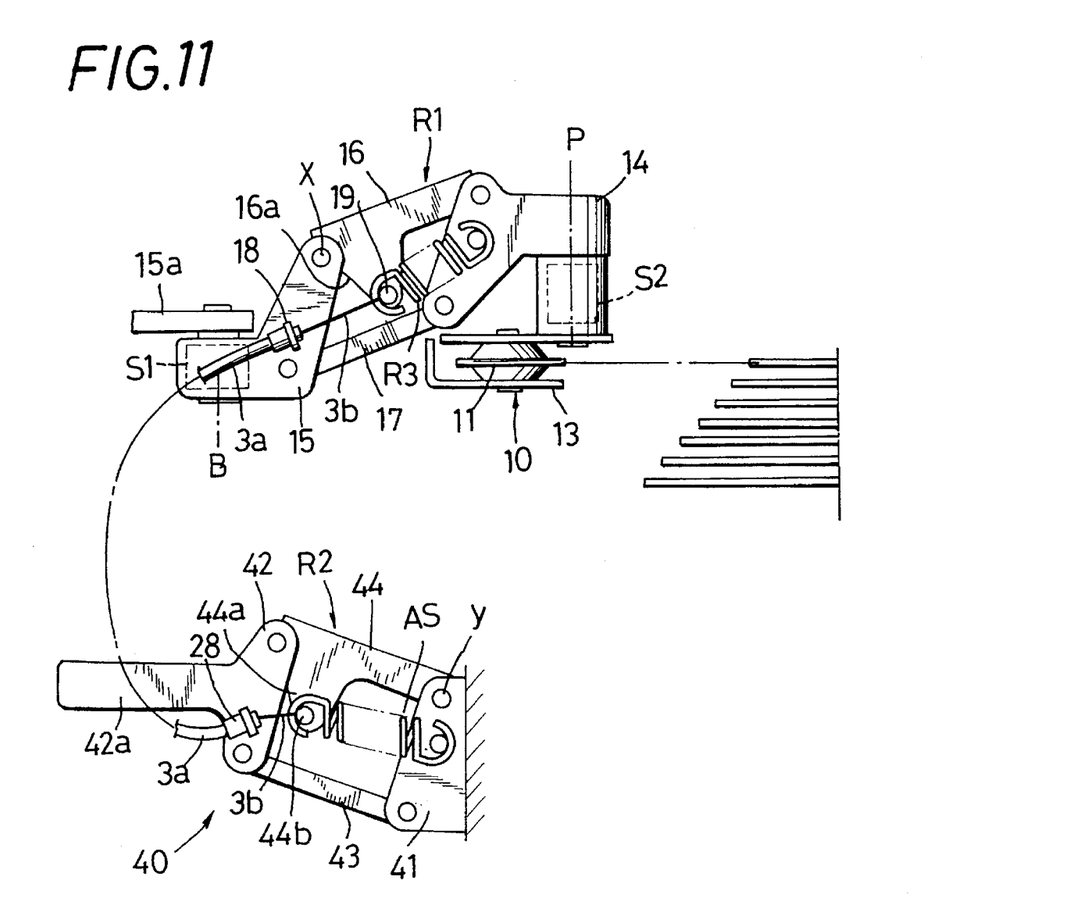
FIG. 11 is a diagram of an alternative embodiment of the present invention.

FIG. 11 depicts an alternative embodiment of a shifting control device 40 according to the present invention wherein the cable tension CT1 exerted by the assist spring AS on the inner cable 3b remains constant or virtually constant. Specifically, a base member 41 configured so as to be fixed to a handlebar 2, and a shifting lever 42 provided with a control arm 42a are connected together by a pair of swing links 43 and 44, and the base member 41, the swing links 43 and 44, and the shifting lever 42 are configured in such a way that a parallel four-link mechanism R2 is formed. An assist spring AS (tensile coil spring) is attached between the base member 41 and an arm component 44a projecting from one of the two swing links 43 and 44 (namely, the swing link 44), the shifting lever 42 is provided with an outer holder 18 for supporting the outer cable 3a of the control cable 3, and a cable support component 44b is provided for connecting the inner cable 3b of the control cable 3 to the aforementioned arm component 44a by means of a cable fixing screw 19.

The base member 41 is the fixed link of the parallel four-link mechanism R2, and the shifting lever 42 is the moving link of the parallel four-link mechanism R2. The shifting lever 42 can move in relation to the handlebar 2. That is, the parallel four-link mechanism R2 serves as an attachment mechanism for the shifting lever and movably connects the shifting lever 42 to the handlebar 2. Moving the shifting lever 42 swings the swing link 44 and the shifting lever 42 in relation to each other, making it possible to let out or pull the inner cable 3b of the control cable 3. Moving the shifting lever 42 swings the swing link 44 and the base member 41 in relation to each other and changes the distance between the assist spring connection location of the swing link 44 and the assist spring connection location of the base member 41, making it possible to perform deformation that accompanies the shifting operation of the assist spring AS.

Figure 12:
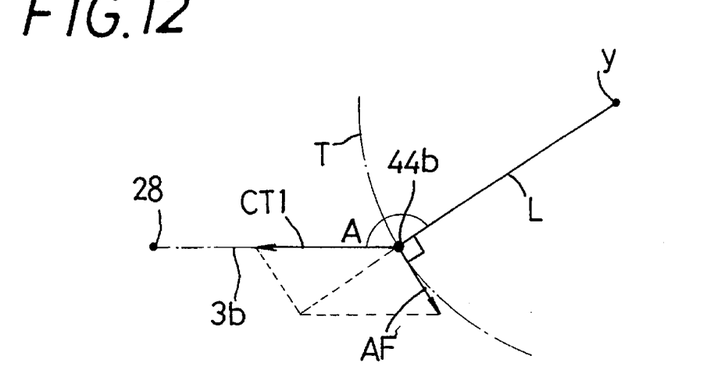
FIG. 12 is a geometrical diagram of cable tension in a particular embodiment of the present invention.

With the link-type shifting control device 40, the cable serving as the connection point of the inner cable 3b moves along a circular-arc trajectory T as shown in FIG. 12 whose center is a connecting pin axis Y serving as the connection center between the swing link 44 and the attachment member 41. If it is assumed that an assist force AF for swinging the swing link 44 is generated for the assist spring AS along this trajectory T, then cable tension CT1 will be exerted on the inner cable 3b between the cable support component 44b and the outer holder 18 due to this assist force AF. The tension value ratio of this cable tension CT1 to the assist force AF varies with the inclination angle A formed by the inner cable 3b with a line L passing through the cable support component 44b and the connecting pin axis X. As a result, changing the aforementioned inclination angle A in a suitable manner prevents the cable tension CT1 from undergoing any changes or makes these changes smaller than those of the assist force AF even when the cable connection point 19 moves and the assist force AF changes due to changes in the length of the assist spring AS. The aforementioned inclination angle A is determined by setting the positional relationship for the cable support component 44b of the swing link 44 and the outer holder 18 of the shifting lever 42. Selecting a suitable positional relationship for the cable support component 44b and the outer holder 18 will therefore yield a constant or virtually constant cable tension CT1 exerted by the assist spring AS, irrespective of the changes in the operating position of the shifting lever 42. The specifications of the parallel four-link mechanism R2 for this shifting control device can be the same as those of the parallel four-link mechanism R1 for the derailleur 10, and the same kind of balance can be achieved between the tension CT1 exerted on the inner cable 3b by the assist spring AS of the shifting control device 40 and the tension CT2 exerted on the inner cable 3b by the return spring RS of the derailleur 10.

While the above is a description of various embodiments of the present invention, further modifications may be employed without departing from the spirit and scope of the present invention. For example, the present invention was described as applying to a shifting control device for a rear derailleur, but it can also be applied to a shifting control device for a front derailleur. In that case, the guide pulley 11 and a guide pulley for changing the chain engagement of a front derailleur will therefore be collectively referred to as "chain guide members 11," and the aforementioned parallel four-link mechanisms R1 will be collectively referred to as "coupling mechanisms R1 for attaching the chain guide members 11 to the bicycle frame."

The shifting control device attachable to the handlebar can have a structure in which the device is supported on the lever bracket 22 and is attached to the handlebar 2 together with the brake lever 5. It is also possible to have a structure in which a dedicated attachment member separate from the lever bracket 22 is provided, and the device is independently attached to the handlebar 2 separately from the brake lever 5. The present invention is also applicable to a case in which the shifting control device is formed by a rotary controller rotatably set on a handlebar instead of the aforementioned shifting levers 21 and 42. Such a controller forms a handlebar grip and is designed for operating the derailleurs through the intermediary of a control cable. These shifting levers and rotary controllers will therefore be collectively referred to as "shifting control pieces 21 and 42," and the lever bracket 22 will be referred to as "the base member 22."

The present invention is applicable to a case in which the shifting control device is designed for controlling a derailleur configured in such a way that the return spring actuates the chain guide member in the direction of higher speeds, as well as to a case in which the shifting control device is designed for controlling a derailleur configured in such a way that the return spring actuates the chain guide member in the direction of lower speeds. In such a case, the assist spring energizes the shifting control pieces in the direction of higher speeds.

Figure 17:
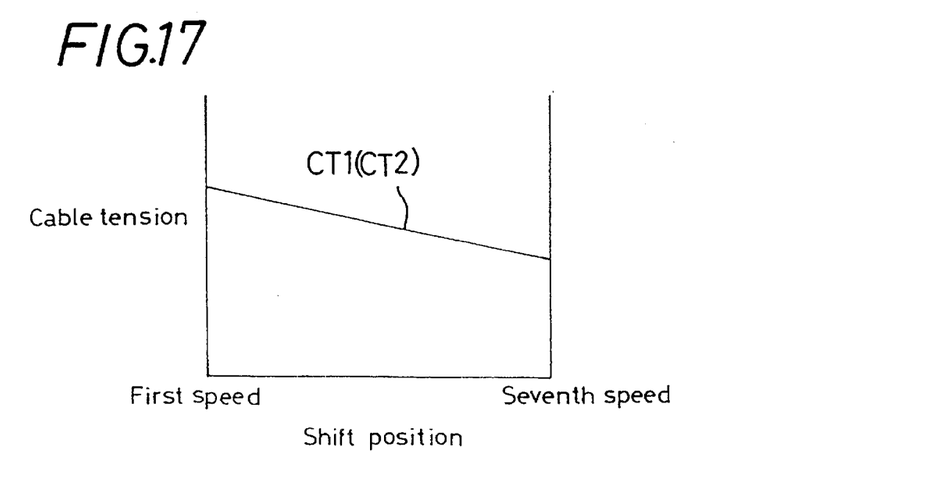
FIG. 17 is a graph illustrating cable tension in another embodiment of the present invention.

The shifting control device pertaining to the present invention can be used to operate a derailleur in which the cable tension exerted by the return spring is kept constant or virtually constant, and balance is maintained with respect to the cable tension generated by the assist spring. The shifting control device pertaining to the present invention can also be used to operate a derailleur in which the cable tension exerted by the return spring is constant or virtually constant, but there is no balance with respect to the cable tension generated by the assist spring, or to operate a derailleur in which the cable tension generated by the return spring varies with shifting. Alternatively, it can also be applied to a case in which, as shown in FIG. 17, the cable tension CT1 and the cable tension CT2 remain balanced while their values change as the two springs are deformed.

Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A bicycle shifting device for actuating, through a control cable (3) having an inner cable (3b) which slides within an outer casing (3a), a derailleur (10) having a return spring (RS), the device comprising:

a base member (22, 41);

a movable member (21, 44) coupled to the base member (22, 41) for pivoting about an axis (24a, Y) and having a cable support (21b, 44b) to which the inner cable (3b) is attached, wherein the movable member (21, 44) moves the cable support (21b, 44b) as the movable member (21, 44) rotates to actuate the derailleur (10);

an outer casing holder (28) spaced apart from the cable support (21b, 44b) so that the inner cable (3b) extends in a straight line from the outer casing holder (28) to the cable support (21b, 44b);

an assist spring (AS) having one portion fixed relative to the base member (22, 41) and another portion coupled for movement with the movable member (21, 44) for biasing the movable member (21, 44) in a direction opposite a direction of biasing of the movable member (21, 44) by the return spring (RS);

wherein the cable support (21b, 44b) supports the control cable (3) such that the inner cable (3b) maintains a straight line between the outer casing holder (28) and the cable support (21b, 44b) as the cable support (21b, 44b) moves the inner cable (3b) to actuate the derailleur (10) and does not wind around the cable support (21b, 44b) as the cable support (21b, 44b) moves the inner cable (3b) to actuate the derailleur (10); and wherein an inclination angle (A) defined by the image cable (3b) and a line (L) extending from the cable support (21b, 44b) to the axis (24a, Y) varies as the cable support (21b, 44b) moves the inner cable (3b) so that tension exerted by the assist spring (AS) on the inner cable (3b) remains substantially constant regardless of a position of the movable member (21, 44) as the shifting device actuates the derailleur (10).

2. The device according to claim 1 wherein the assist spring (AS) comprises a torsional coil spring connected between the base member (22) and the movable member (21).

3. The device according to claim 2 wherein the movable member (21) comprises a shifting lever having first and second finger control tabs (21A, 21B) in separate positions in the direction of movement of the movable member (21), and further comprising:

a positioning unit (21e, 25, 29) for positioning the movable member (21) in selected operating positions.

4. The device according to claim 3 wherein the base member (22) comprises a lever bracket for connecting a brake lever (5) to the handlebar (2).

5. The device according to claim 1 further comprising:

a manually operated control lever (42a);

a first connecting link (43) having a first end connected to the base member (41) and a second end connected to the control lever (42a);

wherein the movable member (44) comprises a second link member having a first end connected to the base member (41) and a second end connected to the control lever (42a); and wherein the cable support (44b) comprises a projection on the movable member.

6. The device according to claim 5 wherein the assist spring (AS) comprises a coil spring having a first end connected to the projection and a second end connected to the base member (41).

7. A bicycle shifting device comprising:

a control cable (3) having an inner cable (3b) that slides within an outer casing (3a); a bicycle derailleur (10) including:
 a derailleur base member (15) for coupling the derailleur (10) to a bicycle frame;
 a guide pulley (11) coupled to the derailleur base member (15) for movement in a reciprocating manner;
 a return spring (RS) for biasing the guide pulley (11) in a return direction;
 a movable derailleur member (16) coupled to the derailleur base member (15) for pivoting about an axis (X) and having a derailleur control cable support (19) to which the inner cable (3b) is attached, wherein the movable derailleur member (16) moves the cable support (19) as the guide pulley (11) reciprocates;
 wherein the derailleur control cable support (19) supports the inner cable 3(b) so that the return spring (RS) exerts a first tension on the inner cable 3(b) as the guide pulley (11) reciprocates;

a shift control device (20, 40) for actuating the derailleur (10) through the control cable (3) including:
 a base member (22, 41);
 a movable shift control member (21, 44) coupled to the base member (22, 41) for pivoting about an axis (24a, Y) and having a shift control cable support (21b, 44b) to which the inner cable (3b) is attached, wherein the movable shift control member (21, 44) moves the shift control cable support (21b, 44b) as the movable shift control member (21, 44) rotates to actuate the derailleur (10);
 a shift control outer casing holding (28) spaced apart from the shift control cable support (21b, 44b) so that the inner cable (3b) extends in a straight line from the shift control outer casing holder (28) to the shift control cable support (21b, 44b);
 an assist spring (AS) having one portion fixed relative to the base member (22, 41) and another portion coupled for movement with the movable shift control member (21, 44) for biasing the movable shift control member (21, 44) in a direction opposite a direction of biasing of the movable shift control member (21, 44) by the return spring (RS);
 wherein the shift control cable support (21b, 44b) supports the control cable (3) so that the assist spring (AS) exerts a second tension on the control cable (3) as the shifting device actuates the derailleur (10), and so that the inner cable (3b) maintains a straight line between the shift control outer casing holder (28) and the shift control cable support (21b, 44b) as the shift control cable support (21b, 44b) moves the inner cable (3b) to actuate the derailleur (10) and does not wind around the shift control cable support (21b, 44b) as the shift control cable support (21b, 44b) moves the inner cable (3b) to actuate the derailleur (10); and wherein an inclination angle (A) defined by the inner cable (3b) and a line (L) extending from the cable support (21b, 44b) to the axis (24a, Y) varies as the cable support (21b, 44b) moves the inner cable (3b) so that a difference between the first tension and the second tension remains substantially constant across substantially the entire operating range of the shift control device.

8. The device according to claim 7 wherein the first tension and the second tension remain substantially constant across substantially the entire operating range of the shift control device (20, 40).

9. The device according to claim 7 wherein the difference between the first tension and the second tension remains substantially constant across substantially the entire operating range of the shift control device in a state where no guide pulley reaction acts on the guide pulley (11).

10. The device according to claim 7 wherein the assist spring (AS) comprises a torsional coil spring connected between the shift control base member (22) and the movable shift control member (21).

11. The device according to claim 10 wherein the movable shift control member (21) comprises a shifting lever having first and second finger control tabs (21a, 21b) in separate positions in the direction of movement of the movable shift control member (21), and further comprising:
 a positioning unit (21e, 25, 29) for positioning the movable shift control member (21) in selected operating positions.

12. The device according to claim 11 wherein the shift control base member (22) comprises a lever bracket for connecting a brake lever (5) to the handlebar (2).

13. The device according to claim 7 wherein the shift control device (20, 40) further comprises:
 a manually operated shift control lever (42a);
 a first shift control connecting link (43) having a first end connected to the shift control base member (41) and a second end connected to the shift control lever (42a);
 wherein the movable shift control member (44) comprises a second shift control connecting link having a first end connected to the shit control base member (41) and a second end connected to the shift control lever (42a); and
 wherein the shift control cable support (44b) comprises a projection on the movable shift control member.

14. The device according to claim 13 wherein the assist spring (AS) comprises a coil spring having a first end connected to the projection and a second end connected to the shift control base member (41).

15. The device according to claim 7 wherein the derailleur further comprises:
 a first derailleur connecting link (17) having a first end connected to the base member (15) and a second end connected to the guide pulley (11);
 wherein the movable derailleur member (16) comprises a second derailleur connecting link having a first end connected to the base member (15) and a second end connected to the guide pulley (11); and
 wherein the derailleur control cable support (19) comprises a projection on the movable derailleur member (16).

16. The device according to claim 15 wherein the derailleur control cable support (19) moves the control cable (3) in a straight line.

17. The device according to claim 16 wherein the derailleur control cable support (19) moves the control cable without winding the control cable (3) about the derailleur control cable support (19).

18. The device according to claim 17 further comprising a derailleur outer holder (18) for supporting the outer cable (3*a*) at the derailleur, wherein the derailleur control cable support (19) supports the inner cable (3*b*) so that the inner cable (3*b*) maintains a straight line from the derailleur outer holder (18) to a location where the inner cable (3*b*) is connected to the derailleur control cable support (19) as the derailleur control cable support (19) moves so that an inclination angle (A) defined by the inner cable (3*b*) and a line (L) extending from the derailleur control cable support (19) to the axis (X) varies as the derailleur cable support (21*b*, 44) moves the inner cable (3*b*) so that the first tension remains substantially constant regardless of a position of the movable derailleur member (16).

19. A bicycle shifting device comprising:

a transmission (10) connected to a transmission cable (3) and having a return spring (RS) for exerting a first tension on the transmission cable (3);

a shift control device (20, 40) coupled to the transmission cable (3) and having an assist spring (AS) for exerting a second tension on the transmission cable (3); and maintaining means for maintaining a difference between the first tension and the second tension substantially constant across substantially the entire operating range of the shifting device.

20. The device according to claim 19 wherein maintaining means maintains the first tension and the second tension substantially constant across substantially the entire operating range of the shifting device.

* * * * *